United States Patent [19]
Theis, Jr.

[11] 3,733,143
[45] May 15, 1973

[54] SPEED GOVERNED ROTARY DEVICE

[75] Inventor: James V. Theis, Jr., Park Forest, Ill.

[73] Assignee: Hollymatic Corporation, Park Forest, Ill.

[22] Filed: Sept. 8, 1971

[21] Appl. No.: 178,648

[52] U.S. Cl. ............... 415/80, 32/27, 415/25, 415/82, 415/214, 415/503
[51] Int. Cl. ............................................. F01d 1/18
[58] Field of Search ............... 415/25, 80, 503, 415/82, 214; 416/240; 32/27

[56] References Cited

UNITED STATES PATENTS

| | | | |
|---|---|---|---|
| 400,610 | 4/1889 | Tuerk, Jr. | 415/25 |
| 444,938 | 1/1891 | Kinkaid | 415/25 |
| 3,578,872 | 5/1971 | McBurnie | 415/25 |

Primary Examiner—C. J. Husar
Attorney—Axel A. Hofgren et al.

[57] ABSTRACT

A rotary device with a speed governor and having a centrifugally radially expandable rotor with a drive surface acted upon by pressurized fluid, either gas or liquid, for this rotating the rotor and a fluid passage in the rotor to this surface including an inlet for the fluid and valve means in the rotor fluid passage movable to restrict flow of the fluid to the surface upon centrifugal expansion of the rotor in order to govern the speed of rotation. The disclosure is also directed to a rotor having such a drive surface and centrifugally operated valve means for restricting flow of the fluid in the rotor to the surface to govern the speed of rotation. The disclosure is further directed to a hollow flexible rotor expandable radially under centrifugal forces to move the sides of the rotor toward each other during this centrifugal expansion and a fluid valve in the rotor that is moved toward closed position by the centrifugal expansion to govern the speed of the rotor.

17 Claims, 5 Drawing Figures

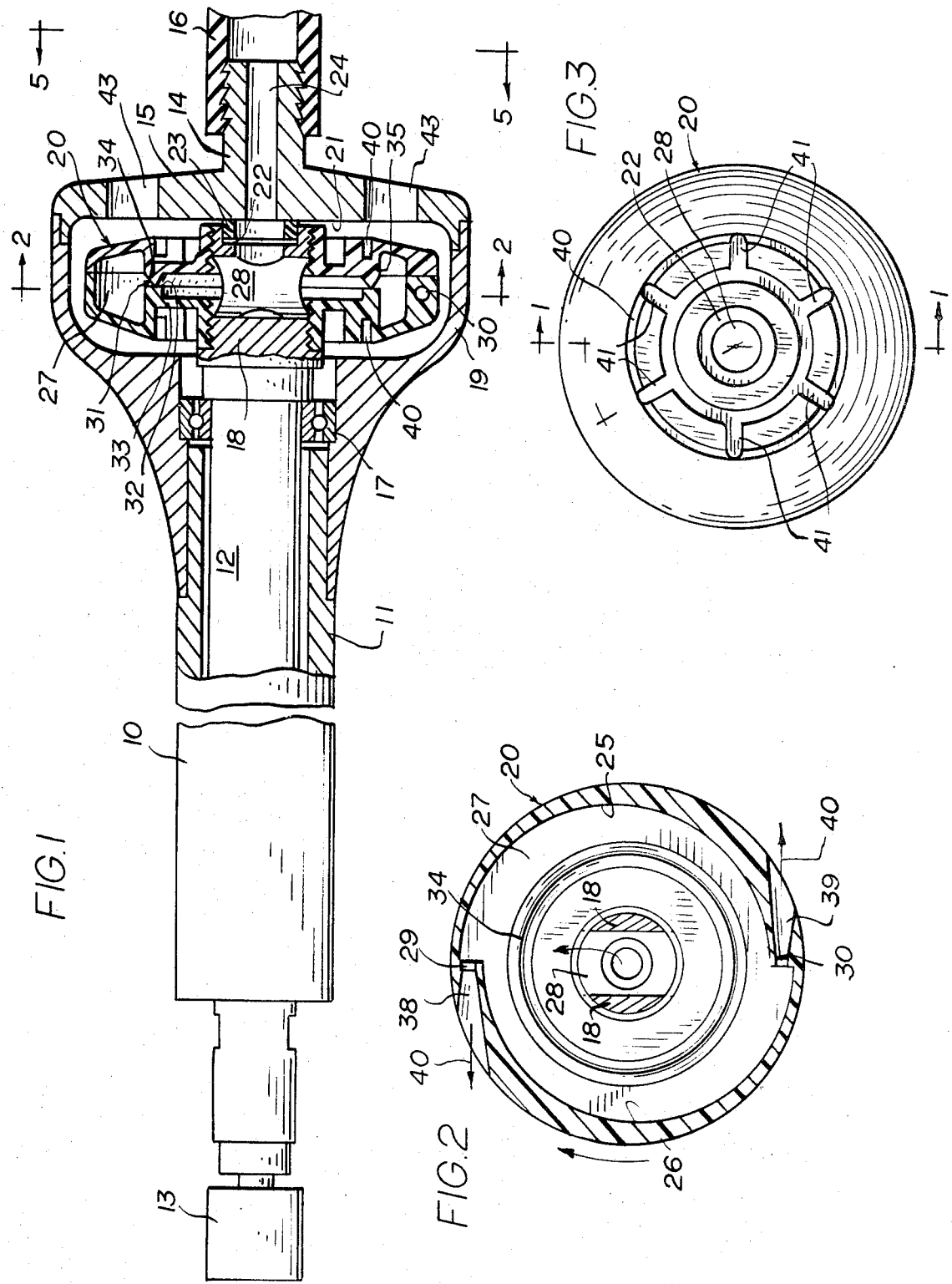

SPEED GOVERNED ROTARY DEVICE

BACKGROUND OF THE INVENTION

The field of the invention is pressurized fluid operated rotary devices that customarily operate at high speed and that have speed governors for limiting the speed to a desired maximum.

The most pertinent prior art of which applicant is aware are U.S. Pat. Nos. 3,128,989; 3,475,106 and 3,578,872, all of which are directed to centrifugally operated speed governed rotary devices. However, these do not have the simplicity, compactness nor the invention features of the present invention.

SUMMARY OF THE INVENTION

In this invention the rotor which has a drive surface acted upon by the pressurized fluid for rotating the rotor also includes a fluid passage in the rotor to this surface and centrifugally operated valve means also in the rotor fluid passage for restricting flow of pressurized fluid to the drive surface at a selected speed of rotation to govern the speed to a preselected maximum. In one embodiment of the invention the rotor is radially expandable under increasing centrifugal forces and this expansion is used to operate the fluid flow restricting valve means. In a specifically disclosed embodiment of the invention the entire rotor is constructed of a flexible material such as an elastomer so that the rotor is distortable radially under centrifugal force and it is distortable laterally by the internal fluid pressure.

BRIEF DESCRIPTION OF THE DRAWINGS

FIG. 1 is a side elevational view partially in section of a high speed grinder operated by compressed air and illustrates one embodiment of the invention taken along line 1—1 of FIG. 3.

FIG. 2 is a transverse sectional view taken substantially along line 2—2 of FIG. 1.

FIG. 3 is an end elevational view of the rotor of FIG. 1.

DESCRIPTION OF THE PREFERRED EMBODIMENT

Figure 4:
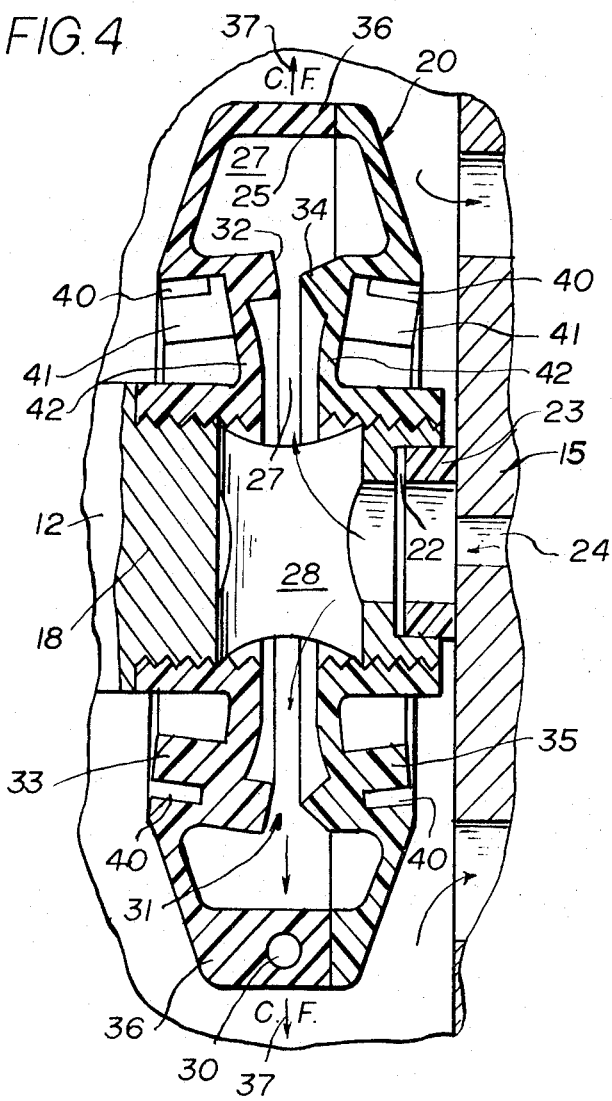
FIG. 4 is an enlarged sectional view through the rotor and adjacent parts illustrating a position of the rotor sides during rotation.
Figure 5:
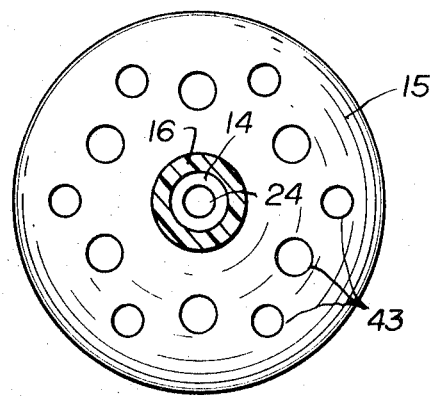
FIG. 5 is a sectional view taken substantially along line 5—5 of FIG. 1.

In the embodiment shown in the drawings the pressurized fluid engine 10 comprises an elongated casing 11 having a rotatable shaft 12 therein whose forward end extends from the casing and may be used for operating a small grinding wheel 13 such as may be used for grinding metal. The engine, a term used generically to indicate a device for converting pressurized fluid into power, is designed in the illustrated embodiment to operate on compressed gas such as compressed air. The engine is provided with a fluid inlet means 14 of tubular shape integral with and extending rearwardly of a rear cover 15 for the casing. This tube 14 receives and retains the end of the flexible compressed air pressure hose 16.

The rear end 18 of the shaft 12 beyond an end bearing assembly 17 extends into an enlarged circular rear chamber 19 and has mounted thereon a rotor 20 made of a flexible elastomer such as flexible nylon.

The end surface of the shaft end 18 is located adjacent the inner surface 32 of the rear cover 15. In this end of the shaft there is provided a circular chamber 22 in which is located an annular seal 23 which is concentric along with the outer circumference of the chamber 22 with the axis of rotation of the shaft 12 and the rotor 20. With this arrangement pressurized fluid from the supply passage 24 and the interior of the rotor 20 presses the seal 23 rearwardly against the inner surface 21 so that the rotor and shaft combination rotates relative to the seal 23. This arrangement of rotor, shaft and seal is disclosed and claimed in Theis et al copending application Ser. No. 170,234, filed Aug. 9, 1971 and now U.S. Pat. No. 3,708,241.

The rotor 20 is provided with internal surfaces illustrated by the two symmetrically positioned Archimedes spiral surfaces 25 and 26 which are at the inner periphery of an annular hollow internal chamber 27 in the rotor.

The rotor therefore contains on its hollow interior a fluid passage having a central inlet 28 at the axis of the rotor and a pair of outlets 29 and 30 with the fluid being directed toward the outlet 29 by the arcuate surface 25 and to the outlet 30 by the arcuate surface 26.

Between the axial inlet 28 and the peripheral outlets 29 and 30 there is provided a centrifugally operated valve means 31 for restricting flow of fluid to the surfaces 25 and 26 and thus the outlets 29 and 30 upon increasing rotation of the rotor for thereby governing the speed of rotation. In the illustrated embodiment this valve means comprises separable elements held apart during rotation of the rotor by internal pressure of the pressurized fluid (here air) as illustrated in FIG. 4. These elements include an annular flat surface member 32 integral with the flexible side 33 of the rotor on the interior thereof and an angular member 34 on the opposite flexible side 35 adapted to make substantially a circular line contact with the surface 32 when the valve is closed as shown in FIG. 1.

These elements 32 and 34 and thus the valve means itself are arcuately arranged and in the illustrated embodiment extend for 360° and are coaxial with the chamber 19, the rotor 20 and the axis of rotation of the shaft 12 and rotor 20. Thus as can be seen from the above description and from the illustrated embodiment the valve means 31 extends substantially completely across the fluid passage within the rotor which, as explained, extends from the entrance 28 to the exit nozzles 38 and 39. In the embodiment as illustrated the surfaces 25 and 26 also extend for substantially 360° around the axis of rotation.

The rotor 20 is being flexible both at the periphery 36 and sides 33 and 35 is centrifugally radially expandable when subjected to centrifugal forces during rotation as indicated by the centrifugal force arrows 37 in FIG. 4. Rotation, of course, occurs when the pressurized fluid flows into the rotor by way of the inlet 28, radially outwardly through the internal chamber 27 and between the separated valve elements or members 32 and 34, against the arcuate surfaces 25 and 26, through the outlets 29 and 30 and from the rotating rotor through the diametrically oppositely located nozzles 38 and 39 as indicated by the arrows 40. The centrifugal force of the rotating rotor by radial expansion of the rotor tends to draw the flexible sides 33 and 35 thus the valve elements 32 and 34 toward each other to restrict the fluid flow through the radial chamber 27. This serves to restrict the fluid flow upon increasing rotational speed and thereby operates as a governor.

The flexibility of the rotor sides containing the valve elements 32 and 34 is enhanced by providing circular grooves 40 that are also concentric with the axis of rotation and by providing radial grooves 41 on the outer surfaces of the rotor sides. These grooves 40 and 41 therefore comprise hinge elements on the sides imparting a predetermined degree of flexibility to the sides and thereby predetermining the maximum speed of rotation. In one embodiment compressed air was supplied to the rotor at about 80 pounds per square inch pressure and at a flow rate of 15 cubic feet per minute and the device operated at about 80,000 rpm. In this device the external diameter of the rotor 20 was 1.64 inches and the external diameter of the grooves 40 was 1.01 inches while the thickness at the sides 42 was about 0.03 inch.

In operation the pressurized fluid such as compressed air was supplied to the rotor interior through the passage 24 and inlet 28. The pressure of the fluid immediately held the valve elements 32 and 34 apart to their maximum extent and rotation of the rotor immediately commenced. Then, under increasing rotational speed the rotor expanded at the periphery 36 which drew the valve elements 32 and 34 toward each other. This had the effect of restricting flow of fluid past these elements to the exit nozzles 38 and 39 so as to limit or govern the maximum speed of rotation. The air flow from the nozzles 38 and 39 flowed through the chamber 19 to the exterior by way of end openings 43 which directed the exhaust fluid rearwardly away from the grinding wheel 13.

The operating r.p.m. of the engine 10 can be controlled by controlling the mass of the periphery of the rotor 20.

Having described my invention as related to the embodiment shown in the accompanying drawings, it is my intention that the invention be not limited by any of the details of description, unless otherwise specified, but rather be construed broadly within its spirit and scope as set out in the appended claims.

I claim:

1. A speed governed rotary device, comprising: a centrifugally radially expandable rotor having a drive surface acted upon by pressurized fluid for rotating said rotor and a fluid passage in said rotor to said surface including an inlet for said fluid; and valve means in said rotor fluid passage movable to restrict flow of said fluid in said passage to said surface upon centrifugal expansion of said rotor, thereby governing the speed of rotation of said rotor.

2. The device of claim 1 wherein said rotor comprises a centrifugally distortable portion comprising said valve means.

3. The device of claim 1 wherein said rotor is hollow to provide an interior chamber comprising a centrifugally distortable side comprising said valve means.

4. The device of claim 3 wherein there are a pair of said centrifugally distortable sides both having cooperating valve members comprising said valve means.

5. The device of claim 3 wherein said drive surface is arcuate and is located within the rotor at the periphery of said chamber.

6. The device of claim 5 wherein said valve means is arcuate and said inlet is located substantially concentrically with said arcuate valve means.

7. A speed governed rotary device, comprising: a hollow rotor having a drive surface acted upon by pressurized fluid for rotating said rotor and a fluid passage in said rotor to said surface including an inlet substantially at the center of said rotor for said fluid; and centrifugally operated valve means extending for approximately 360° in said rotor fluid passage for restricting flow of said fluid to said surface upon rotation of said rotor for thereby governing the speed of rotation of said rotor.

8. The device of claim 7 wherein said valve means comprises separable elements held apart during rotation of said rotor by the pressure of said pressurized fluid.

9. The device of claim 8 wherein said drive surface also extends substantially 360°.

10. The device of claim 8 wherein the axis of rotation of the rotor, said inlet, and said valve means are substantially coaxial.

11. A speed governed rotary device, comprising: a hollow flexible rotor expandable radially under centrifugal forces having a drive surface acted upon by pressurized fluid for rotating the rotor and a fluid passage in said rotor to said surface including an inlet for said fluid spaced from said surface; valve means in said fluid passage between said inlet and said surface for controlling supply of said pressurized fluid to said surface and thereby the speed of rotation of said rotor; and valve operating means on said rotor tending to close said valve means upon said centrifugal expansion of said rotor to control the speed thereof.

12. The device of claim 11 wherein said rotor includes a pair of flexible sides comprising said valve operating means and the valve includes cooperating valve elements on said sides, the sides being spaced apart during rotation.

13. The device of claim 12 wherein said valve operating means comprises hinge elements on said sides imparting a predetermined degree of flexibility to said sides.

14. The device of claim 13 wherein said hinge elements on said sides comprise thin portions of the sides.

15. The device of claim 14 wherein said thin portions in said flexible sides are circular and are substantially concentric to the axis of rotation.

16. The device of claim 12 wherein said valve means comprises substantially circular cooperating valve elements on said opposite sides and positioned in said fluid passage, said sides being held spaced apart by internal pressure of said pressurized fluid.

17. The device of claim 16 wherein said valve operating means comprises hinge elements on said sides imparting a predetermined degree of flexibility to said sides, and wherein said hinge elements are circular, and said hinge elements, valve elements and axis of rotation are substantially coaxial.

* * * * *